(12) United States Patent
Benson et al.

(10) Patent No.: US 8,528,420 B2
(45) Date of Patent: Sep. 10, 2013

(54) ECCENTRIC VENTURI FLOW MEASUREMENT DEVICE

(75) Inventors: Benny Benson, Sisters, OR (US); Jason MacKenzie, Sisters, OR (US)

(73) Assignee: Energyneering Solutions, Inc., Sisters, OR (US)

( * ) Notice: Subject to any disclaimer, the term of this patent is extended or adjusted under 35 U.S.C. 154(b) by 384 days.

(21) Appl. No.: 12/958,509

(22) Filed: Dec. 2, 2010

(65) Prior Publication Data

US 2011/0132104 A1   Jun. 9, 2011

Related U.S. Application Data

(60) Provisional application No. 61/283,924, filed on Dec. 9, 2009.

(51) Int. Cl.
*G01F 1/44* (2006.01)

(52) U.S. Cl.
USPC ................................... 73/861.63

(58) Field of Classification Search
None
See application file for complete search history.

(56) References Cited

U.S. PATENT DOCUMENTS

| | | | |
|---|---|---|---|
| 1,706,145 A | 3/1929 | Collins | |
| 3,636,765 A * | 1/1972 | Brown | 73/861.64 |
| 3,736,797 A * | 6/1973 | Brown | 73/861.64 |
| 3,774,645 A * | 11/1973 | Pompa | 73/861.63 |
| 4,102,186 A | 7/1978 | Brown | |
| 4,174,734 A * | 11/1979 | Bradham, III | 73/861.63 |
| 4,237,739 A | 12/1980 | Owen | |
| 4,926,698 A | 5/1990 | Owen | |
| 4,961,349 A * | 10/1990 | Tanis | 73/861.52 |
| 5,127,173 A * | 7/1992 | Thurston et al. | 73/861.63 |
| 5,616,841 A | 4/1997 | Brookshire | |
| 6,058,787 A * | 5/2000 | Hughes | 73/861.63 |
| 6,655,221 B1 * | 12/2003 | Aspelund et al. | 73/861.04 |
| 6,672,173 B2 | 1/2004 | Bell | |
| 6,725,731 B2 | 4/2004 | Wiklund | |
| 6,799,477 B2 | 10/2004 | Brookshire | |
| 7,096,738 B2 | 8/2006 | Schumacher | |
| 7,281,436 B1 | 10/2007 | Orleskie | |
| 7,299,707 B1 | 11/2007 | Evans | |
| 7,509,880 B2 | 3/2009 | Kurz | |
| 2011/0100135 A1 * | 5/2011 | Franco et al. | 73/861.63 |
| 2011/0185805 A1 * | 8/2011 | Roux et al. | 73/861.63 |

FOREIGN PATENT DOCUMENTS

GB          2217462 A          10/1989

\* cited by examiner

*Primary Examiner* — Harshad R Patel
(74) *Attorney, Agent, or Firm* — Hancock Hughey LLP

(57) ABSTRACT

An eccentric, smoothly tapered body for installation into cylindrical pipe to cause a constriction in the pipe to facilitate measuring the flow of fluid through the pipe. The body defines a flow constrictor having a smoothly tapered inner surface having a leading edge and a trailing edge and an apex therebetween. A bore extends through the flow constrictor at the apex. Pressure is measured at the bore at the apex and upstream of the flow constrictor and flow rate is calculated from the pressure differential therebetween.

9 Claims, 3 Drawing Sheets

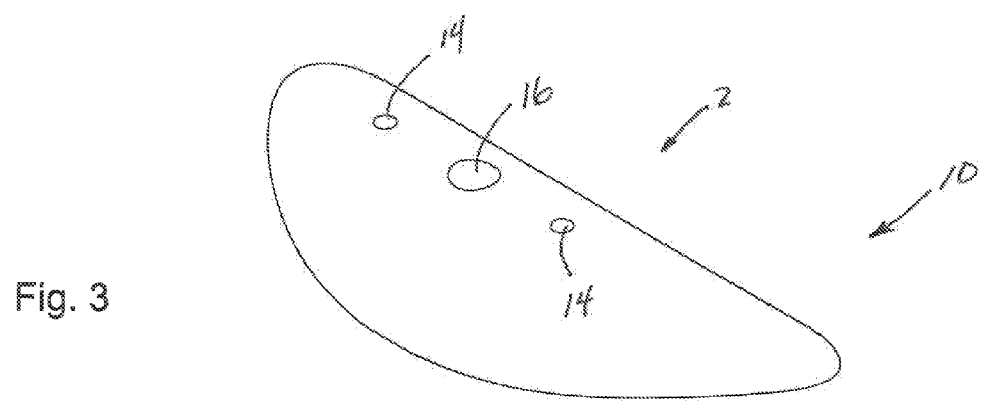
Fig. 3
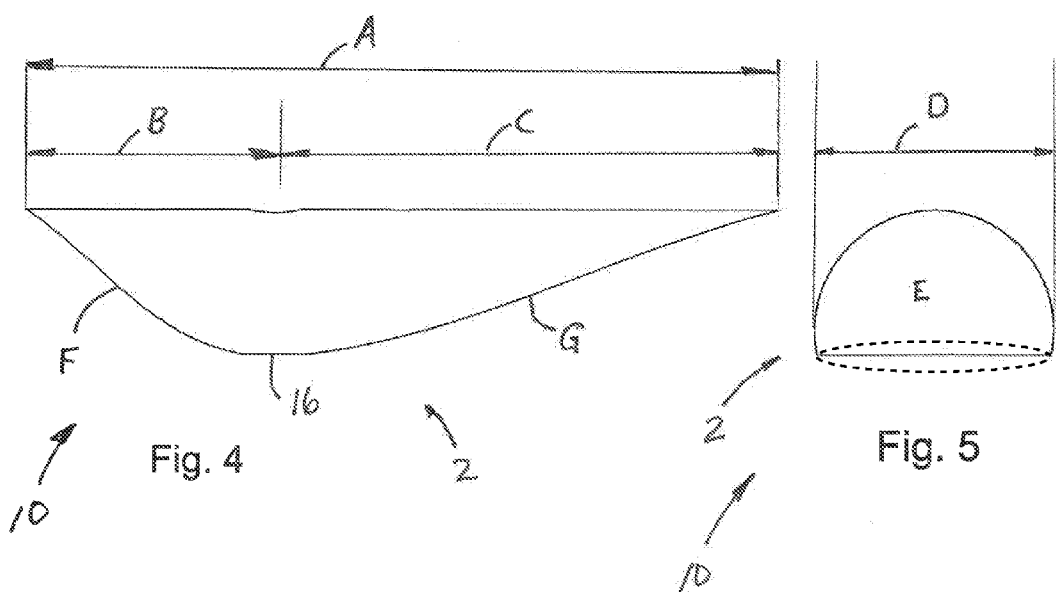
Fig. 4
Fig. 5

US 8,528,420 B2

ECCENTRIC VENTURI FLOW MEASUREMENT DEVICE

FIELD OF THE INVENTION

This invention relates to apparatus and methods for measuring fluid flow, and more particularly to apparatus and methods for obtaining accurate gas flow measurements in challenging environments such as landfills.

BACKGROUND

The following patents are noted as being relevant to the field of the present invention:
U.S. Pat. No. 7,509,880 "Fluid flow meter body with high immunity to inlet/outlet flow disturbances" to Kurz;
U.S. Pat. No. 7,299,707 "Eccentric venturi flow meter" to Evans;
U.S. Pat. No. 7,281,436 "Wedge flow meter with conditioner" to Orleskie;
U.S. Pat. No. 7,096,738 "Inline annular seal-based pressure device" to Schumacher;
U.S. Pat. No. 6,799,477 "Flow metering device for landfill gas extraction well" to Brookshire;
U.S. Pat. No. 6,725,731 "Bi-directional differential pressure flow sensor" to Wiklund;
U.S. Pat. No. 6,672,173 "Flow meter" to Bell; U.S. Pat. No. 5,616,841 "Flow metering device for landfill gas extraction well" to Brookshire;
U.S. Pat. No. 4,926,698 "Dual wedge flow element" to Owen;
U.S. Pat. No. 4,237,739 "Integral flow metering assembly using a segmental wedge" to Owen;
U.S. Pat. No. 4,102,186 "Method and system for measuring flow rate" to Brown; and
GB Patent No. 2217462 to Brady.

Global surface temperature warming is believed by the Intergovernmental Panel on Climate Change, among others, to be caused by increased concentrations of green house gases resulting from human activities. Man-made global warming, as it is commonly called, is perceived as a serious threat by scientists and legislative bodies in the United States of America (USA) and across the globe. Laws and international treaties addressing this threat have been, and will be, discussed, negotiated and passed. In the USA prospective legislation on "Cap and Trade" is advocated by President Obama, House Speaker Pelosi and Senate Majority Leader Reid related restrictive legislation in the USA appears inevitable. Regardless of the legitimacy of the science or the status of such legislation or treaties there are legitimate reasons to control and reduce green house emissions. It is axiomatic measuring and monitoring these gases, in particular the emissions thereof, invariably will play a critical role in their control and reduction.

Landfills are often prolific contributors of green house gases, particularly methane (CH4) which according to the EPA is a greenhouse gas approximately 21 times more potent than carbon dioxide (C02), emissions. A common method of waste disposal and treatment, landfills produce these gases, among others, from the anaerobic digestion by microbes of organic matter. These gases, typically composed of mostly methane and carbon dioxide, may be collected and methane in particular may be utilized, with contemporary technology, to generate electricity by combustion, fuel industrial boilers, or be converted to pipeline quality High-BTU gas. In utilizing the methane from the landfill, greenhouse gas emissions are greatly reduced.

Landfills frequently have gas extraction systems to capture landfill gases. Gases are typically drawn out of a landfill with a low pressure vacuum via a wellfield collection system. The wellfield typically consists of multiple gas extraction wells that extend deep beneath the surface of the landfill to pull methane from a location near the bottom of the landfill. Each extraction well extends up to the surface of the landfill and there the extraction wells are manifolded together so that vacuum can be pulled with one centralized blower or compressor.

It is critical to regulate the vacuum draw on the landfill well field. In order to do so, each extraction well must be continuously monitored for flow and gas quality. Measuring the gas flow at the head of each extraction well permits an operator with a gas analyzer to compile the total gas quality and volume produced by a landfill well field and may assist in making decisions based thereon. Regulating the vacuum or draw on the field regulates, to a degree, the type and rate of decomposition. Too much draw may pull oxygen into the well field enabling aerobic decomposition and causing underground fires thus requiring shutdown of the well field resulting in unrestricted release of greenhouse gases into the atmosphere. Too small of a draw will increase gas diffusion into surrounding soil and eventual release of methane into the atmosphere. Typically each extraction well utilizes a valve at the head of the well to adjust the vacuum pulled on the well. After monitoring the extraction well's gas flow and composition, an operator may adjust this valve to optimize gas recovery or limit oxygen pull into the landfill.

Landfill gas monitoring and recovery could be referred to as a wet gas industry because the gases created in landfills produce water in addition to oxygen, nitrogen, methane and carbon dioxide. Typically landfill gas is collected from the well field 100 percent saturated or as a wet gas. The wet gas, the possibility of particulates, and low pressures associated with these systems present some significant challenges for gas measuring devices. The prior art is replete with devices used to calculate gas flow. The Venturi effect is well known in the art wherein constricted fluid flow results in differential pressures from which flow can be calculated. Fluid flow may be measured with an orifice plate or a Pitot tube, both of which are well known in the art and are considered the industry standards for landfills today. Other wedges and eccentric devices which recognize the Venturi Effect and Bernoulli's principles may be used to create differential pressure in a pipe in order to measure gas flow. The orifice plate design utilizes an abrupt restriction in the flow to create a differential pressure for calculating flow. Because of the abrupt restriction there is a high loss in applied vacuum to the extraction well being monitored. Given the low pressures involved and the desire to regulate the extraction well's vacuum it is preferred that the measuring device has a minimal impact on system pressure. Additionally, the abrupt restriction of a concentric or eccentric orifice plate does not allow the unobstructed pass-through of liquids and possibly particulates. The retaining of liquids at the orifice plate impacts the flow measurement and the liquid is often ingested into the pressure monitoring equipment, or flow monitoring equipment, which is extremely detrimental to the internal sensors. Over time, if too much water builds up at the orifice plate, the orifice can become plugged entirely, cutting off vacuum to the extraction well and resulting in unrestricted release of methane into the atmosphere. Pitot tubes work on the principle of calculating flow through the process of determining the velocity of ram pressure as compared to the static pressure. Because landfill gas is typically both a wet and dirty gas, with particulates (solids) a Pitot tube monitoring device is often plugged at the ram air pitot port. Despite these drawbacks and limitations, including their propensity for erroneous pressure readings due to clogging of orifices and pitot ports, orifice plates and pitot tubes are currently considered the landfill gas industry standards for measuring extraction well flow.

The prior art includes U.S. Pat. No. 1,706,145 "Differential Pressure Device." FIG. 1 in said patent depicts an eccentric Venturi device for purposes similar to the subject invention and of a design similar to the subject invention.

SUMMARY OF THE INVENTION

The subject invention is designed for use as a flow calculating and monitoring device and specifically in low pressure wet gas environments such as in landfill gas well fields and similar industries or applications for the purposes of obtaining accurate and unobstructed gas flow measurements, and in particular methane gas flow measurements in the landfill environment, while having the ability to remain ambivalent to potentially disruptive liquids and solids. The design is based on standard fluid mechanics and airfoil principles. The change in pressure created as fluid passes over the air foil-designed device is utilized to calculate an accurate flow measurement. An operator uses gas analyzers, or functional equivalent thereof, to measure the methane content of the gases expelled from the landfill gas well field.

The subject invention overcomes the challenges of current well head technology by providing landfill operators accurate flow readings, a wide measurement range—in particular, and according to one embodiment, the ability to measure 0.01 inches of water, or a 2.8 SCFM to 12.50 inches of water, or 100 SCFM, and unobstructed liquid passage, reduced maintenance and downtime and varied placement options. These attributes result in reduced maintenance costs, reduced facility down-time and increased confidence in flow measurement. The subject invention is compatible with current monitoring instruments and may be horizontally or vertically orientated over a wide flow range.

The subject invention achieves its advantages and benefits from its specific profile which minimizes disruption of fluid flow upstream and downstream and therefore losses in the applied well field vacuum; minimal pressure loss, and in the case of LFG, vacuum loss may be an imperative for the proper monitoring of landfill well field applications. The subject invention also may provide an unobstructed pass-through of liquids and/or debris to the downstream side of the subject invention without hindering or impacting flow measurements.

The subject invention achieves its advantages and benefits in the low vacuum environment of landfill well fields by constricting the flow pipe from approximately 40% to 90% with an eccentric Venturi flow device, while maintaining fully developed flow and minimizing differential pressure loss across the metering run while acquiring accurate and reliable readings over a wide range of pressures and over a shortened metering run.

BRIEF DESCRIPTION OF THE DRAWINGS

The invention will be better understood and its numerous objects and advantages will be apparent by reference to the following detailed description of the invention when taken in conjunction with the following drawings.

FIG. 3 is an isometric of the subject invention.

FIG. 4 is a side view of the subject invention.

FIG. 5 is an end view of the subject invention.

Figure 1:
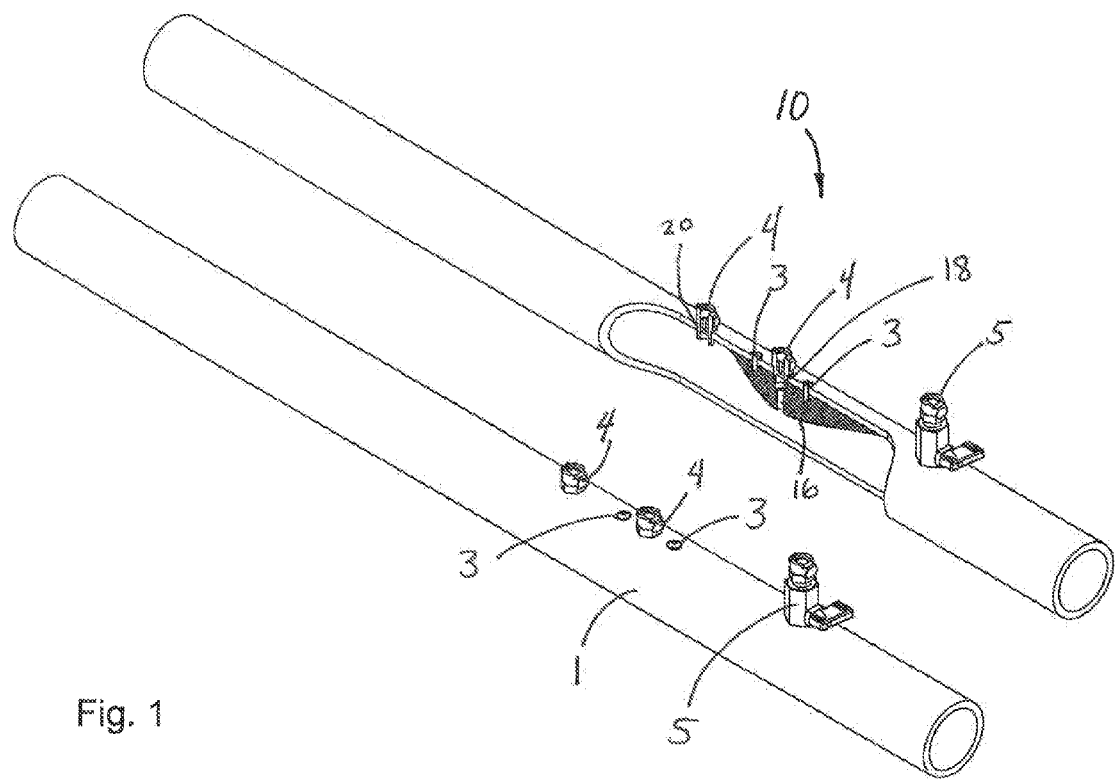
FIG. 1 is an isometric view, partially cutaway view of the subject invention and its environment of use in a pipe that defines a metering run.

The following table 1 is a list of exemplary specifications and dimensions for preferred and illustrated embodiments of the subject invention:

TABLE 1

| Embodiment | A | B | C | D | E | F | G |
|---|---|---|---|---|---|---|---|
| 1 | 4 | 1.5 | 2.75 | 1 | 80 | $Y = -0.2379x^3 + 0.2305x^2 + 0.6496x - 0.0021$ | $Y = 0.0701x^3 - 0.6286x^2 + 1.4738x - 0.3225$ |
| 2 | 4.25 | 1.5 | 2.75 | 1.5 | 64 | $Y = -0.1684x^3 + 0.0197x^2 + 0.9588x$ | $Y = 0.0506x^3 - 0.4972x^2 + 1.1791x$ |
| 3 | 5 | 1.75 | 3.25 | 1.5 | 72 | $Y = -0.1344x^3 + 0.0787x^2 + 0.8511x$ | $Y = 0.0378x^3 - 0.4295x^2 + 1.1996x$ |
| 4 | 5.25 | 2 | 3.25 | 1.5 | 80 | $Y = -0.1231x^3 + 0.1608x^2 + 0.7243x$ | $Y = 0.032x^3 - 0.4105x^2 + 1.2905x$ |
| 5 | 5 | 2 | 3 | 2 | 50 | $Y = 0.1584x^4 - 15.85x^3 + 594.9x^2 - 9918.3x$ | $Y = 0.0152x^4 - 1.6609x^3 + 67.85x^2 - 1230.2x$ |
| 6 | 6 | 2 | 4 | 2 | 64 | $Y = -0.1796x^3 + 0.2835x^2 + 0.7158x$ | $Y = 0.0179x^3 - 0.2403x^2 + 0.6959x$ |
| 7 | 8 | 2.44 | 5.56 | 2 | 82 | $Y = -0.1796x^3 + 0.3187x^2 + 0.6134x$ | $Y = 0.0076x^3 - 0.1339x^2 + 0.4546x$ |
| 8 | 8 | 2.67 | 5.33 | 3 | 60 | $Y = -0.1036x^3 + 0.2276x^2 + 0.7541x - 0.0095$ | $Y = 0.0103x^3 - 0.1826x^2 + 0.6758x + 1.0217$ |

Notes for Table 1:
Embodiments 1 through 6 illustrate models of the invention defined herein having different sizes and dimensions
A, B and C = dimensions shown on FIG. 4 (expressed in inches)
D = nominal pipe size as shown on FIG. 5 (expressed in inches)
E = meter run area reduction as shown on FIG. 5 (expressed in percentage)
F = Leading Edge Curve Equation
G = Trailing Edge Curve Equation As used herein, the following acronyms have the follow meanings:
EVFMD is Eccentric Venturi Flow Measurement Device;
SCFM is Standard Cubic Feet per Minute;
LFG is Landfill Gas; and
HDPE is High-Density Polyethylene.

DESCRIPTION OF THE INVENTION

Preferred embodiments of the eccentric venture flow measuring device 10 according to the present invention are illustrated in the drawing figures and the tables above. In the drawings, like numerals are used to refer to like and corresponding parts of the various drawings and tables.

The subject invention has the ability to pass-through liquids unobstructed while still being able to maintain a sufficient differential pressure for flow measurement. It also may maintain a void near the primary sample extraction point so as to not pull liquids into the sample stream.

The preferred embodiments and dimensions of the eccentric venturi flow measuring device 10 according to the present invention are illustrated and specified in the figures and in Table 1. Those of ordinary skill in the art will readily appreciate that the dimensions may be variable and those referred to in Table 1 are exemplary only and not intended to limit the scope of the invention. With reference to FIG. 1, eccentric venture flow measuring device 10 is defined by an eccentric metering apparatus 2 that defines an insert that is installed in the interior of a length of cylindrical pipe 1, referred to on occasion as the "metering run" of pipe. The eccentric metering apparatus 2 may be located and affixed (installed) to the interior surface of a pipe 1 in any appropriate location, including for example a well head pipe by any of a number of means known in the art. FIG. 5 depicts an end view of the eccentric venturi flow measuring device 10, but does not depict the pipe, which is preferably plastic such as PVC, within which the subject invention is affixed for proper function. However, FIG. 5 does depict dimension D which is the nominal pipe size of the pipe within which the subject invention is affixed.

FIG. 1 depicts the preferred method of use of the eccentric venturi flow measuring device 10. Specifically, flow measuring device 10 is preferably installed in a desired location in the interior of pipe 1 with a pair of bolts 3 that are inserted through appropriately spaced bores 12 formed in the pipe 1 and into threaded bores 14 formed in metering apparatus 2. A through bore 16 is formed in metering apparatus 2 at the apex of the eccentric curvature of the apparatus. When metering apparatus 2 is installed in the interior of pipe 1 with bolts 3, through bore 16 aligns with a bore 18 formed through pipe 1 and a quick connect port 4 is fitted into the aligned bores (i.e., through bore 16 in metering apparatus 2 and bore 18 in pipe 1). An identical quick connect port 4 is fitted into a bore 20 adjacent to and immediately upstream of metering apparatus 2—as used herein, the term "upstream" refers to the direction of fluid flow through pipe 1, as illustrated with arrow B in FIG. 2A. Each of the quick connect ports is attached to pressure monitoring equipment (not shown) of conventional design so that the fluid pressure in pipe 1 may be measured at each port 4.

Figure 2A:
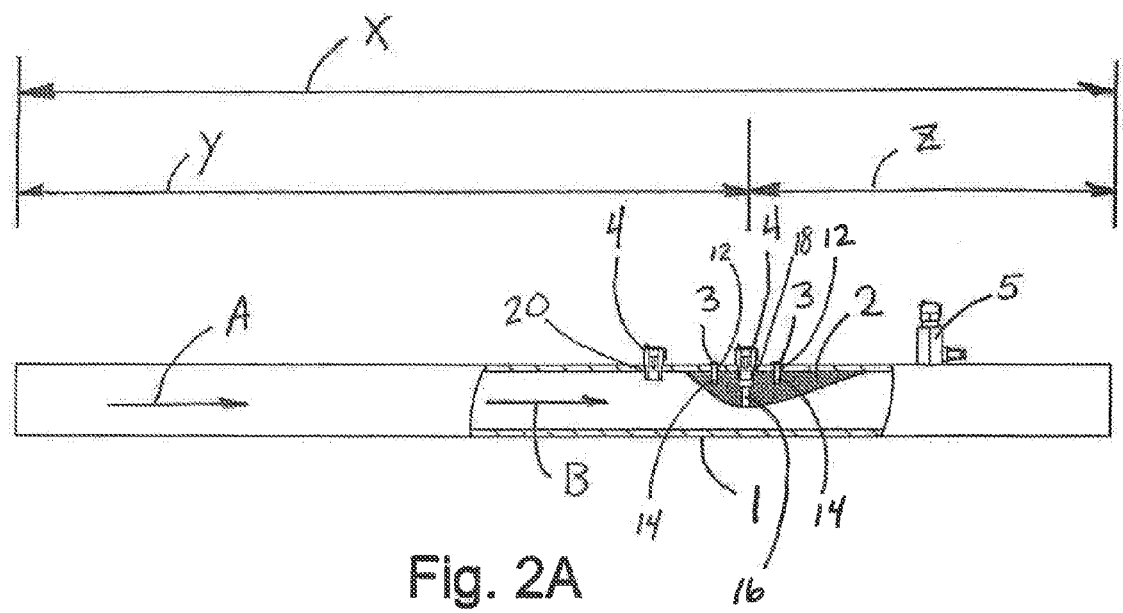
FIG. 2A is a cut away side view of the subject invention and its environment of use.
Figure 2B:
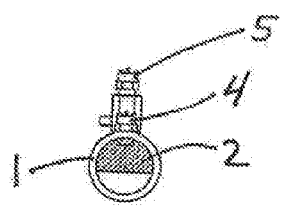
FIG. 2B is an end view of the embodiment of FIG. 2A.

FIG. 2A is a side view of the cut away isometric view of the eccentric venturi flow measuring device 10 depicted in FIG. 1. The eccentric venturi flow measuring device 10 according to the present invention may be retrofitted for an existing well field or be original equipment for a new well field. Arrow A in FIG. 2A refers to the slope of pipe 1 relative to the ground plane, which in FIG. 2A is horizontal. As will be noted from FIGS. 2A and 2B, in a horizontal pipe orientation it is preferred that the eccentric venturi flow measuring device 10 of the invention is affixed to the top of the inside pipe surface thereby utilizing gravity to keep water and particulates from clogging, occluding or otherwise interfering with the through bore 16 and aperture inside the pipe and exposed to fluid flow—the "bottom" aperture of the hollowed core. Alternatively, the eccentric venturi flow measuring device 10 may be in a vertically oriented pipe 1

With continued reference to FIG. 2A, the preferred dimension for the overall length of pipe 1 is represented by dimension X—i.e., the "metering run," and is preferably about 36 inches. It will in this sense be appreciated that pipe 1 with eccentric venturi flow measuring device 10 installed therein may be assembled and then retrofitted into an existing gas flow pipe in a well field. Dimension Y is the preferred distance from the center of through bore 16, which is the apex of measuring apparatus 2, to the upstream end of pipe 1, and is preferably about 24 inches. Dimension Z is the distance from the center of through bore 16 to the downstream end of pipe 1, and is preferably about 12 inches. These dimensions may of course vary as necessary.

FIG. 3 depicts the top side of the measuring apparatus 2 according to the invention—that is, the side of apparatus 2 that abuts the interior of pipe 1 when apparatus 2 is installed as shown in FIG. 1. The shape of the top side is of a constant radius of curvature substantially defined by the inside surface of the pipe within which the subject invention will be affixed. The two smaller holes depicted in FIG. 3—threaded bores 14—receive the bolts 3 that affix apparatus 2 to the inside diameter of the pipe. The relatively larger through bore 16 is adapted for receiving the quick connector port 4 for pressure measuring. The through bore 16 extends completely through apparatus 2 and as noted, the center of the bore 16 is preferably positioned at the apex of the bottom side of the subject invention (the "bottom side" of apparatus 2 being the side of the apparatus that is exposed to the interior of pipe 1 when installed as shown in FIG. 1). The axis defined by through bore 16 is preferably substantially normal to the direction of gas flow in the pipe—which is the longitudinal axis through pipe 1.

FIG. 4 depicts a side view of the measuring apparatus 2 according to the subject invention. Apparatus 2 includes leading edge F and trailing edge G. Table 1 provides details for F and G and how the slopes and relative relationships between the leading and trailing edges vary depending upon the sizes of eccentric venturi flow measuring device 10 dimensions and the size of pipe 1.

FIG. 5 is an end view of a single measuring apparatus 2 wherein the eccentric venturi flow measuring device 10 depicted in FIG. 4 occludes more than 50% of the inside area of pipe 1, represented with dimension D—see Table 1.

With returning reference to the end view shown in FIG. 2, and also FIG. 5, the metering apparatus 2 occlusion of pipe 1 is of a shape wherein it is defined by the interior surface of pipe on its top and sides, namely a constant radius of curvature along the inside surface of pipe and a straight horizontal line on its bottom as shown in said end views in FIGS. 2 and 5. It should be noted that horizontal line in FIG. 5—that is, dimension D—is the outer diameter of the metering apparatus 2 at its greatest height and maximum % of occlusion of the interior of pipe 1. Without departing from the scope of the subject invention, it should be appreciated and understood by those skilled in the art that variations in the straight line may be made, wherein the cross-sectional shape of the metering apparatus 2 will accordingly vary along the entire, or a portion of the, length of the apparatus 2. The contour of the interior, exposed portions of measuring apparatus 2 may be changed. For example, a convex shape of the top of the measuring apparatus 2, which would change the shape of said horizontal line in FIGS. 2 and 5 to a shape similar to the letter "U", would result in a lesser percentage occlusion of pipe 1. This in turn would reduce the lower range of flow measurement while prompting undesirable channeling or guttering for the gas. The corollary and concave shaped line would increase the area reduction and allow for lower flow measurements with accuracy and precision which is ideal for various low flow applications within or outside the landfill industry.

The preferred dimensions of eccentric venturi flow measuring device 10 are detailed in Table 1. Depending upon the pipe diameter, pipe orientation and myriad environmental factors, one embodiment may be more appropriate over others. Nominal 2 inch and 1.5 inch pipe diameters are common for gas monitoring and/or recovery systems for landfills. Herein, the radius of curvature of the pipe is referred to as r.

The upstream and downstream attenuated shape of the subject invention may permit the restoration of pressure downstream of the device over a minimum of downstream distance which has been demonstrated in wind tunnel tests. Turbulence is minimized downstream due to the specific shape of the device and in particular F and G (FIG. 4) are based upon E (FIG. 5), which is defined as the metering run area reduction. Device dimensions, collectively the shapes of the eccentric venturi flow measuring device 10, are based upon air foil concepts and wind tunnel testing to promote fully developed flow, minimize pressure differential losses and contract the metering run. The metering run is preferably as short as possible as space is often limited for retrofits and even for new systems where in various design options may be preserved regarding other devices and pipe bends by minimizing metering runs. It will be appreciated that in operation the measuring apparatus 2 defines a constriction in the cross sectional area of pipe 1. As with a venturi, fluid flow through the reduced cross sectional area of defined by measuring apparatus 2 is increased and pressure is decreased according to known fluid flow characteristics.

Preferably the device is constructed of inert plastic materials such as PVC, ABS and HDPE. Other materials may include functional equivalents thereof whether polymer based or not. The device may be machined or injection molded as long as tolerances are met.

The industry standard for such fluid measuring devices calls for 10 times the pipe diameter run of pipe upstream of the measuring device and 5 times the pipe diameter run downstream. Given the need to retrofit existing piping systems in landfills, and assuming that the eccentric venturi flow measuring device 10 may need to be sandwiched between other devices, the shorter the in-line linear distance of the measuring run the better. The subject invention fully functions with a minimum of a three times the pipe diameter run of pipe downstream of the measuring device, and five times the pipe diameter run of pipe upstream of the measuring device.

It will be clear, at least to those skilled in the art, that changes may be made to the invention, including but not limited to the addition of elements, the elimination, in whole or in part, of disclosed elements and the modification of disclosed elements, of the invention, without departing from the spirit and scope thereof, and therefore the invention is not limited by that which is disclosed herein and illustrated in the drawings herein. Moreover, alternative materials known to those skilled in the art, may be used, or incorporated in whole or in part, with similar or identical properties as those disclosed herein without departing from the spirit and scope thereof, and therefore the invention is not limited by that which is disclosed herein and illustrated in the drawings herein. Additionally, alternative shapes or modifications to the disclosed shapes maybe used, or incorporated in whole or in part, with similar or identical results as those disclosed herein without departing from the spirit and scope thereof, and therefore the invention is not limited by that which is disclosed herein and illustrated in the drawings or images herein.

The invention claimed is:

1. Apparatus for facilitating the measurement of the flow of fluid through a cylindrical pipe having a radius of curvature and an interior wall surface, comprising:
    a monolithic pipe insert having a longitudinal axis and a first side defining a cylindrical cross-sectional shape with radius of curvature corresponding to the radius of curvature of the cylindrical pipe and extending along an arc of less than 360, said first side terminating at opposed edges, said pipe insert adapted for being affixed to the pipe with the longitudinal axis of the pipe insert substantially parallel to the axis through the pipe and the first side of the pipe insert abutting the interior wall surface of the pipe, and said pipe insert having a second side exposed to the interior of said pipe and defining a constriction in the cross sectional area of the pipe, the second side defining a smoothly tapered shape extending along the longitudinal axis and defined by a leading edge, a trailing edge, and an apex between the leading and trailing edges, wherein the pipe insert at the apex thereof defines a surface extending between the opposed edges and normal to the axis through the pipe, and a bore extending through the pipe insert at the apex and extending in a direction normal to the pipe axis, and wherein the pipe insert abuts the interior wall surface of the pipe along an arc of less than 360 degrees between the opposed edges and defines a reduction in cross sectional area of the pipe of between 40 and 90 percent.

2. The apparatus according to claim 1 wherein the pipe insert at the apex thereof defines a substantially planar surface extending normal to the axis through the pipe.

3. The apparatus according to claim 1 wherein the pipe insert at the apex thereof defines a concave surface extending normal to the axis through the pipe.

4. The apparatus according to claim 1 wherein the pipe insert at the apex thereof defines a convex surface extending normal to the axis through the pipe.

5. A method of measuring the rate of flow of fluid through a pipe, comprising the steps of:
    a) providing a metering run of pipe configured for installation into a piping system, said metering run of pipe defined by a section of cylindrical pipe having a longitudinal pipe axis and a pipe interior defining a 360 degree arc with a diameter d, and a radius of curvature r and first and second bores;
    b) providing a flow constricting member, said flow constricting member defined by a one-piece member having a longitudinal axis, an outer surface having a radius of curvature substantially equal to r, and an inner surface having a leading edge and a trailing edge and an apex between the leading and trailing edges; and a bore extending through said member normal to the longitudinal axis at said apex, the outer surface of said flow constricting member defining an arc of less than 360 degrees so that said flow constricting member does not extend around the entire 360 degree arc of the pipe interior;
    c) installing said flow constricting member into said metering run of pipe by affixing said member to the interior surface of said pipe such that said bore in said member aligns with said first bore through said pipe, and said second bore is positioned spaced apart from said leading edge of said member;
    d) installing said metering run of pipe in said piping system;
    e) attaching pressure measuring apparatus to the first and second bores in said pipe;
    f) causing fluid to flow in said piping system in the direction defined by the leading edge of the member to the trailing edge of the member;
    g) measuring the pressure at the first and second bores in said pipe and calculating the rate of fluid flow through said pipe.

6. Apparatus for facilitating the measurement of fluid flow rate, comprising the combination of:

a length of cylindrical pipe having a longitudinal pipe axis and a pipe interior defining an arc of 360 degrees with a radius of curvature and first and second bores extending through the wall of the pipe and into the interior of the pipe;

a monolithic flow constrictor defined by an elongate body having, said flow constrictor having an outer surface with a radius of curvature substantially equal to r, said outer surface terminating at opposed edges of said constrictor so that the arc of the outer surface between the opposed edges is less than 360 degrees, and a smoothly tapered inner surface having a leading edge and a trailing edge and an apex between the leading and trailing edges, and a bore extending through said flow constrictor at said apex, said flow constrictor affixed to the interior surface of the pipe such that said bore in said flow constrictor is aligned with said first bore through said pipe, said second bore is positioned spaced apart from said leading edge of said flow constrictor.

7. The combination according to claim 6 wherein the flow constrictor at the apex thereof defines a surface extending normal to the longitudinal pipe axis.

8. The combination according to claim 6 the length of cylindrical pipe and the flow constrictor are preassembled and retrofitted into an existing piping system.

9. The combination according to claim 8 wherein the existing piping system is in a landfill well field.

* * * * *